Figure 1:
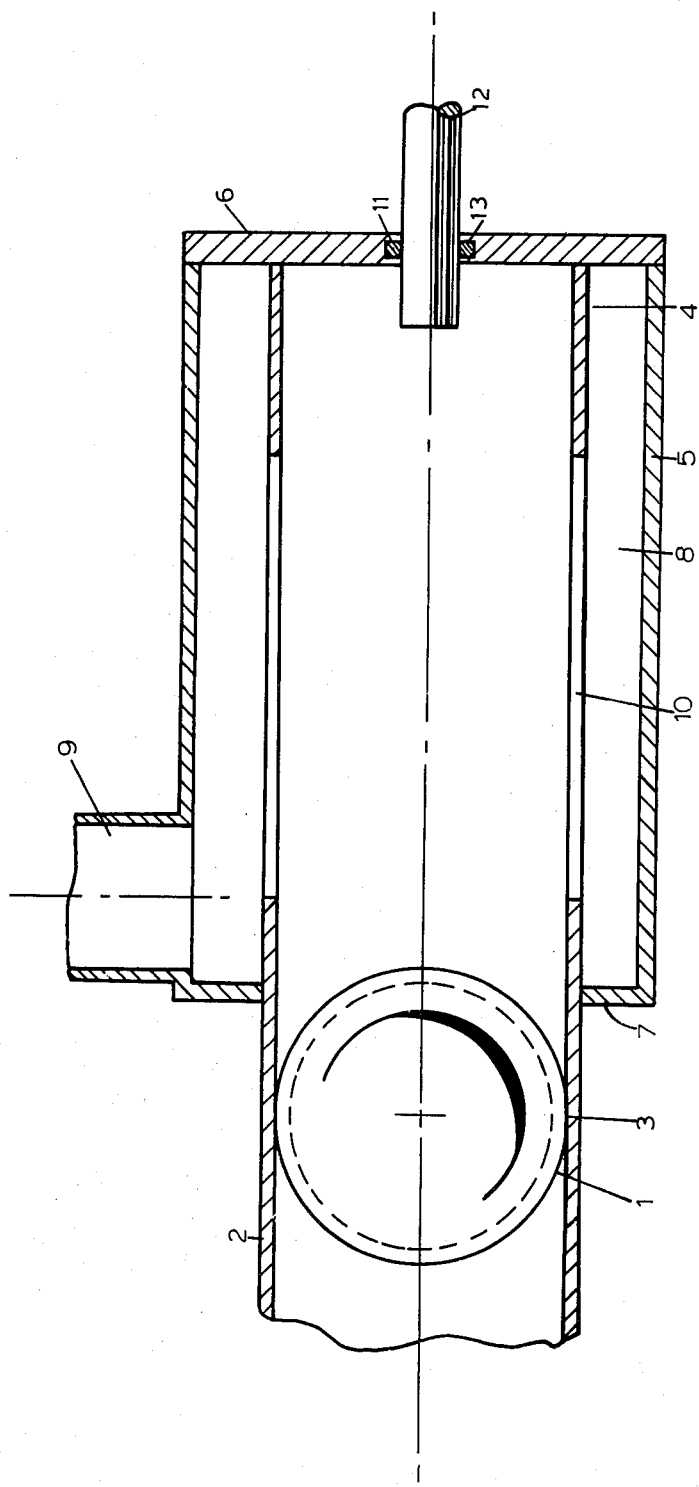

United States Patent [19]

Hayward

[11] 4,237,921

[45] Dec. 9, 1980

[54] LAUNCHING AND ARRESTING A DISCRETE OBJECT IN A PIPELINE

[75] Inventor: Alan T. J. Hayward, Leamington Spa, England

[73] Assignee: The Secretary of State for Industry in Her Britannic Majesty's Government of the United Kingdom of Great Britain and Northern Ireland, London, England

[21] Appl. No.: 926,114

[22] Filed: Jul. 19, 1978

[30] Foreign Application Priority Data

Jul. 20, 1977 [GB] United Kingdom ............... 30525/77

[51] Int. Cl.³ .............................................. G01F 25/00
[52] U.S. Cl. ............................. 137/268; 15/104.06 A; 73/3
[58] Field of Search ....................... 15/104.06 A; 73/3; 137/268

[56] References Cited

U.S. PATENT DOCUMENTS

| | | | |
|---|---|---|---|
| 2,755,742 | 7/1956 | Vincent | 15/104.06 A X |
| 3,978,708 | 9/1976 | Hayward | 15/104.06 A X |
| 4,124,065 | 11/1978 | Leitner | 15/104.06 A X |

Primary Examiner—Gerald A. Michalsky

Attorney, Agent, or Firm—Cushman, Darby & Cushman

[57] ABSTRACT

A device for arresting and/or launching a discrete body at the end of a pipeline in which the body forms a sliding seal and through which the body is carried by fluid flow comprises a length of pipe continuous with and opening into the pipeline, and having a closed end remote from the pipeline, the internal cross-section of said length of pipe being substantially the same as that of the pipeline; a casing forming a chamber on the exterior of the said length of pipe; an external connection for fluid flow to or from the chamber; and at least one through which the chamber and the interior of the said length of pipe communicate.

The invention is particularly applicable to the arrestment and launching of displacement members used in flowmeter provers and both functions may be provided in a single device by the provision therein of two sets of apertures, a first set arranged towards the pipeline and shaped and dimensioned to launch the displacement member when fluid flows through the device towards the pipeline and a second set of apertures arranged towards the closed end of the length of pipe and shaped and dimensioned to arrest the displacement member when fluid is present in the said length of pipe.

5 Claims, 3 Drawing Figures

LAUNCHING AND ARRESTING A DISCRETE OBJECT IN A PIPELINE

This invention relates to a device for the arrest of a discrete body carried by fluid flow through a pipeline, and particularly but not exclusively to a device for arresting and/or launching the displacer of a meter prover.

In testing and calibrating of fluid flowmeters, it is common to employ a meter prover in the form of a relatively long pipeline which can be connected in series with a flowmeter under test. Such meter provers are often used, for example, in the calibration of large turbine-type flowmeters, used for metering the flow in oil pipe-lines. Frequently, the arrangement is such that by appropriate manipulation of valves, the flow direction of fluid through the pipeline of the meter prover can be reversed without disconnecting the flowmeter from the meter prover. The meter prover contains a displacer member which normally is of such a size as to form a sliding seal with the internal wall of the pipeline so that it can be carried along by the flow of fluid through the pipeline without significant flow of fluid therepast. The passage of the displacer past two fixed stations, one near to each end of the pipeline, can be detected by various means known to those skilled in the art, and by measuring the time taken for passage between these stations, an accurate measurement of the fluid flow rate can be obtained. Since the same flow passes through the flowmeter under test by virtue of its series connection with the prover pipeline, an accurate calibration of the flowmeter is thus possible.

In the calibration of flowmeters for oil pipelines, the meter prover pipeline will typically have a diameter of about 20 to 40 inches, and the flow velocity through the prover pipeline may be of the order of about 5 feet per second. The displacer may be for example in the form of a hollow, waterfilled sphere of synthetic rubber, or a steel piston having synthetic rubber seals. In any event, the inertia of the displacer will usually be quite large, and it is thus highly desirable that the displacer should be launched and arrested without sudden impact, ie with the smoothest possible acceleration and deceleration. Unless this precaution is observed, a water-hammer effect may occur and the flowmeter could be damaged (eg the bearings of a turbine-type flowmeter), or the pipeline might burst.

The usual method is to provide a long run-up section, typically about 20 ft in length, at each end of the prover pipeline in which the displacer can be accelerated or decelerated by simply adjusting the flow rate gradually as the displacer travels along the run-up section. The flow is kept uniform while the displacer travels between two fixed stations spaced apart along a central length of prover pipeline. The need for a long run-up at each end of the prover pipeline can be extremely inconvenient, and a much preferable method would be to establish steady flow in the prover pipeline and to launch and arrest the displacer directly therein without the need for a long run-up section at each end. This "dynamic" launching method clearly presents far greater difficulty in the avoidance of sudden acceleration and deceleration of the displacer, and the Applicant knows of no prior proposal other than that described in his U.S. Pat. No. 3,978,708; in which this problem is satisfactorily overcome in a dynamic launcher.

In his earlier U.S. Pat. No. 3,978,708 there is described and claimed one form of device for the dynamic arrest and launch of a displacer at the end of a prover pipeline. The present invention is an improvement in or modification thereof. This invention seeks to provide an alternative form of device for the arrest and/or launch of a displacer at the end of a pipeline, which can be both compact and relatively cheap to produce.

According to the present invention, a device for arresting and/or launching a discrete body at the end of a pipeline in which the body forms a sliding seal comprises a length of pipe continuous with and opening into the end of the pipeline, and having a closed end remote from the pipeline, the internal cross-section of the said length of pipe being substantially the same as that of the pipeline; a casing forming a chamber on the exterior of the said length of pipe; an external connection for fluid flow to or from the chamber; and an aperture through which the chamber and the interior of the said length of pipe communicate.

Preferably a plurality of apertures are provided in the form of elongate slots extending in the longitudinal direction of the said length of pipe.

According to one preferred feature of the invention, said at least one aperture includes one or more arrester apertures which are so dimensioned and arranged that when the discrete body is within the said length of pipe the total area of arrester apertures between the said sliding seal and the closed end of the said length of pipe is approximately proportional to the square root of the distance from the discrete body of the said closed end. This arrangement provides substantially uniform deceleration of the discrete body as it approaches the said closed end when a substantially inviscid fluid is present in the said length of pipe.

According to a further preferred feature of the invention the said at least one aperture include one or two launcher apertures which are so dimensioned and arranged that, when the discrete body is within the said length of pipe, the total area of the launcher apertures between the said sliding seal and the pipeline is approximately proportional to the square root of the distance from the seal to the end of the pipeline. This arrangement can provide for substantially constant acceleration of the discrete body when a substantially inviscid fluid flows at a substantially constant rate through the device by way of the external connection into the pipeline.

A preferred embodiment of the device is provided with a set of launcher apertures towards the pipeline and a set of arrester apertures towards the closed end of the said length of pipe, the adjacent extremities of the two sets of apertures being spaced apart by at least the length of the said sliding seal. For ease of manufacture, some or all of the launcher apertures can be extended by at least the length of the sliding seal to meet some or all of the arrester apertures.

The total area of the launcher apertures should preferably be about equal to the cross-sectional area of the pipeline.

The total area of the arrester apertures should also preferably be about equal to the cross-sectional area of the pipeline.

Figure 2:
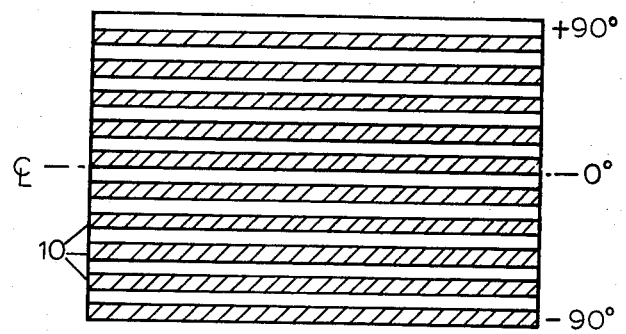
Figure 3:
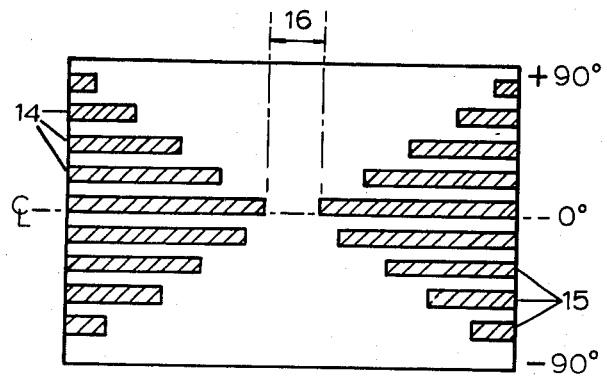

Embodiments of the invention will now be described with reference to the accompanying drawings, of which FIG. 1 is a sectional view of a device in accordance with the invention, FIG. 2 is a schematic developed plan view of the slotted section of the said length of pipe in the embodiment of FIG. 1, and FIG. 3 is a schematic developed plan view of the slotted section of the said length of pipe in an alternative embodiment.

In FIG. 1 there is shown a device for arresting and launching a discrete body in the form of a spherical displacer 1 respectively from and to a pipeline 2 of a meter prover (not shown). In practice, a meter prover would normally be provided with two such devices, one at each end of the prover pipeline. The displacer 1 is in the form of a hollow water-filled sphere of synthetic rubber material, and is of a slightly greater free diameter than that of the pipeline 2 so that it is compressed to form a sliding annular seal therewith as indicated at 3. The pipeline 2 opens into a length of pipe 4, of the same internal diameter and continuous therewith. The length of pipe 4 could alternatively be formed separately from the prover pipeline 2 and connected thereto eg by means of a flanged joint. The length of pipe 4 is closed at its end remote from the pipeline 2 by a disc-shaped end plate 6 and is surrounded co-axially by a cylindrical casing 5. The casing 5 is sealed to the exterior of the length of pipe 5 by the circular plate 6 and an annular plate 7, to form an annular chamber 8 having an external connection for fluid flow to and from the chamber in the form of a connecting pipe 9.

The length of pipe 4 is provided around its circumference, with apertures in the form of evenly spaced slots 10 of equal length. This feature is shown in greater detail in FIG. 2, which is a developed view of one half of the circumference of that section of the length of pipe 4 in which the slots 10 are formed. The shaded areas denote the slots 10. The slots 10 have a total area equal to about twice the cross-sectional area of the prover pipeline 2, plus an allowance for the area covered by the seal 3.

An aperture 11 is provided at the centre of the end plate 6 which receives a ram 12 which can be moved axially of the length of pipe 4 to facilitate launching of the displacer 1 into the prover pipeline 2 as described hereinafter. The ram 12 is sealed around the aperture to the plate 6 by means of an O-ring 13, to resist fluid leakage therepast.

The operation of the embodiment shown in FIGS. 1 and 2 is as follows.

As the displacer 1 approaches the end plate 6 towards the end of a passage through the length of the prover pipeline, (ie travelling from left to right in FIG. 1) a stage will be reached at which the seal 3 passes the left hand ends of the slots 10. From this point onwards, as the displacer continues to travel to the right an increasing proportion of the fluid flow passes through the slots 10 behind the displacer 1 (ie to the left thereof in FIG. 1), thence into the chamber 8 and out through the connecting pipe 9. It will be apparent that the velocity of the fluid flow in front of the displacer will therefore fall smoothly, although the rate of deceleration will not be constant. Eventually, a point will be reached at which the whole of the flow would be capable of passing out through the slots 10 behind the displacer. The total area of the slots is about twice the cross-sectional area of the pipeline 2, and hence if the effects of viscosity and changes in momentum of the fluid are ignored this point will be reached when the seal 3 passes the mid-point of the slots. Moreover, as the displacer continues to move to the right under its own momentum, fluid trapped between the displacer and the end plate 6 is forced out through that portion of the apertures 10 to the right of the seal 3. The cross-sectional area available for the flow of this trapped liquid thus decreases as the displacer continues travelling to the right, thus further ensuring that the displacer is smoothly decelerated until the seal reaches the right-hand extremity of the slots at which point the displacer comes to rest, unless it has already come to rest before this.

In order to re-launch the displacer in the reverse direction along the pipeline 2, the fluid flow direction is reversed by means of valves (not shown) so that the fluid enters through the connecting pipe 9 to flow through the chamber 8 and the slots 10, thence from right to left (as viewed in FIG. 1) along the prover pipeline 2. The displacer is then pushed by means of the ram 12 until the seal 3 passes a zone somewhere near the mid-point of the length of the slots 10, after which fluid flow propels the displacer further to the left. As the displacer continues to move leftwards, the quantity of fluid flowing through slots to the right of the seal and thus to propel the displacer to the left becomes progressively greater. Under these conditions, the hydraulic action can be regarded as the reverse of that occurring during arrest of the displacer, so that the displacer is accelerated smoothly into the prover pipeline 2.

FIG. 3 is a similar view to FIG. 2 showing an alternative arrangement of slots which can be provided instead of that shown in FIG. 2 in the length of pipe 4. The half-circumference of the length of pipe 4 not shown is symmetrical with that shown. With this arrangement, a more nearly uniform deceleration and acceleration of the displacer can be obtained. As seen in FIG. 3, two sets of slots are provided, a left hand set 14 for launching and a right hand set 15 for arresting. Each set of slots has a total area for fluid flow therethrough approximately equal to the cross-sectional area of the pipeline 2. The arrangement is such that as the seal passes the slots 15 moving from left to right (FIG. 3), the total area of slots to the right of the seal is approximately proportional to the square root of the distance of the seal from the end plate 6. This is achieved by staggering the lengths of the slots around the circumference of the length of pipe 4, so that as the seal travels rightwards, the number of slots "uncovered" is proportional to the distance travelled.

Similarly, the arrangement of the slots 14 is such that as the seal 3 passes them moving from right to left (FIG. 3), the total area of slots to the left of the seal 3 is approximately proportional to the square root of the distance of the seal from the prover pipeline 2.

In this arrangement, it is desirable that the two sets of slots 14, 15 should be separated by an unapertured section 16 of the length of pipe 4, the length of this section being equal to the length of the seal 3.

The operation of the device when provided with sets of slots 14, 15 as described with reference to FIGS. 1 and 3 is similar to that described for the device with a single set of slots 10 of equal length (FIGS. 1 and 2), except that the square root relationship between slot area and distance travelled gives rise to substantially uniform acceleration and deceleration of the displacer. Undesirable solid impacts and/or shock waves in the fluid, together with consequent risk of damage to the meter prover and/or the flow meter itself, are thereby minimised.

It will be apparent to those skilled in the art that numerous modifications to the devices specifically described are possible without departing from the scope of the invention.

Thus, the spherical displacer 1 may advantageously in some cases be replaced by a cylindrical piston, which might be of metal (eg steel), provided with one or more seals of synthetic rubber or other suitable material. In this case, the unapertured section 16 of the length of pipe 4 in the embodiment of FIG. 3 should be of a length equal to the maximum distance between the seals on the piston. In the embodiment of FIG. 2, the slots should be lengthened by this distance.

The use of a piston in place of a sphere permits a further useful refinement in the addition to the ram 12 of a device for positively holding the piston after it has been arrested. Thus a piston can be of steel, which a spherical displacer normally is not, so that an electromagnetic holding device would be possible. Alternatively, a mechanical gripping device such as a bayonet-type clutch may be employed, having co-operating parts on the piston and on the ram.

Again, the slots 10, or 14 and 15 could be replaced by apertures of other form, such as a series of circular holes. Drilled holes might prove easier to manufacture than milled slots, and the efficiency of operation could be expected to be only slightly less with holes.

Whilst the specific description has been concerned particularly with the launch and arrest of meter prover displacers, it will be apparent to those skilled in the art that the invention can also readily be applied to other situations where a discrete body is to be launched and arrested in a closely fitting pipeline, without departing from the scope of the invention, for example for the launching and arresting of so-called "pigs" used for cleaning and separating bodies of fluid within a pipeline.

What is claimed is:

1. A device for arresting and/or launching a discrete body at the end of a pipeline in which the body forms a sliding seal, comprising:
   a length of pipe continuous with and opening into said pipeline, and having a closed end remote from said pipeline, the internal cross-section of said length of pipe being substantially the same as that of said pipeline;
   a casing forming an annular chamber on the exterior of said length of pipe said annular chamber being of substantially constant cross-sectional area along its length;
   an external connection for fluid flow to or from said chamber; and
   a plurality of apertures through which said chamber and said length of pipe communicate, said apertures being in the form of a plurality of elongate slots extending in the longitudinal direction of said length of pipe,
   said plurality of apertures including at least one aperture for controlling the arrest of said discrete body which aperture is so dimensioned and arranged that, when said discrete body is within said length of pipe, the total area of arrester apertures between said sliding seal and the closed end of said length of pipe is approximately proportional to the square root of the distance from the discrete body to the closed end.

2. A device according to claim 1 wherein said plurality of apertures includes at least one aperture for controlling the launching of a discrete body which aperture is so dimensioned and arranged that, when the discrete body is within said length of pipe, the total area of the apertures for controlling the launching of said discrete body between said sliding seal and said pipeline is approximately proportional to the square root of the distance from the seal to the end of the pipeline.

3. A device according to claim 1 wherein the total area of said apertures for controlling the arrest of said discrete body is about equal to the cross-sectional area of the pipeline.

4. A device for arresting and/or launching a discrete body at the end of a pipeline in which the body forms a sliding seal, comprising:
   a length of pipe continuous with and opening into said pipeline, and having a closed end remote from said pipeline, the internal cross-section of said length of pipe being substantially the same as that of said pipeline;
   a casing forming an annular chamber on the exterior of said length of pipe said annular chamber being of substantially constant cross-sectional area along its length;
   an external connection for fluid flow to or from said chamber; and
   a plurality of apertures through which said chamber and said length of pipe communicate, said apertures being in the form of a plurality of elongate slots extending in the longitudinal direction of said length of pipe,
   said plurality of apertures including at least one aperture for controlling the launching of a discrete body which aperture is so dimensioned and arranged that, when the discrete body is within said length of pipe, the total area of said apertures for controlling the launching of said discrete body between said sliding seal and said pipeline is approximately proportional to the square root of the distance from the seal to the end of the pipeline.

5. A device according to claim 4 wherein the total area of said apertures for controlling the launching of said discrete body is substantially equal to the cross-sectional area of the pipeline.

* * * * *